US010081107B2

(12) United States Patent
Sakabe

(10) Patent No.: US 10,081,107 B2
(45) Date of Patent: Sep. 25, 2018

(54) SYSTEM AND METHOD FOR MONITORING ENTRY OF OBJECT INTO SURROUNDING AREA OF ROBOT

(71) Applicant: DENSO WAVE INCORPORATED, Chita-gun, Aichi-pref. (JP)

(72) Inventor: Kouji Sakabe, Obu (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/031,650

(22) Filed: Sep. 19, 2013

(65) Prior Publication Data
US 2014/0207285 A1 Jul. 24, 2014

(30) Foreign Application Priority Data

Jan. 23, 2013 (JP) .................. 2013-009948

(51) Int. Cl.
*G06F 19/00* (2018.01)
*B25J 9/16* (2006.01)
(52) U.S. Cl.
CPC .......... *B25J 9/1697* (2013.01); *B25J 9/1676* (2013.01); *G05B 2219/40196* (2013.01); *G05B 2219/40203* (2013.01)
(58) Field of Classification Search
CPC .... B60R 2001/1223; B60R 2001/1253; B60R 21/013; B60R 21/0132; B60R 21/0134; B60R 21/0136; B60R 21/01538; E05F 15/43; E05F 2015/433; G06K 9/00832; G06K 9/00362; G06K 9/00369; G06K 9/00624; G06K 9/209; B25J 9/1694;
(Continued)

(56) References Cited

U.S. PATENT DOCUMENTS

| 4,652,205 A | 3/1987 | Ross et al. |
| 5,760,560 A * | 6/1998 | Ohya et al. ............... 318/568.1 |
| 6,204,469 B1 * | 3/2001 | Fields et al. ............... 219/121.6 |

(Continued)

FOREIGN PATENT DOCUMENTS

| DE | 199 38 639 A1 | 2/2001 |
| DE | 100 00 287 A1 | 7/2001 |

(Continued)

OTHER PUBLICATIONS

Sep. 2, 2015 Office Action issued in German Patent Application No. 10 2013 110 321.9.

*Primary Examiner* — Ronnie M Mancho
(74) *Attorney, Agent, or Firm* — Oliff PLC

(57) ABSTRACT

A monitoring system monitors entry of an object into a surrounding area of a robot. The monitoring system includes visible light irradiation section, a sensor section and a monitoring control unit. The visible light irradiation section irradiates visible light from a level higher than that of the robot toward at least an outer edge portion of at least one of an operating area, which is set up to enclose a movable range of the robot, and a predetermined area which is set up around the operating area. The sensor section monitors entry of a new object, which is not registered in advance, into the operating area. The monitoring control unit issues a request for stopping the robot to a robot control unit that controls the robot, when entry of a new object into the operating area is detected by the sensor section.

12 Claims, 10 Drawing Sheets

(58) Field of Classification Search
CPC ............. G05D 1/00227; G05D 1/0234; G05D 1/0238; G05D 1/028
USPC ....... 700/259, 90, 253, 245, 258; 318/568.1, 318/568.12, 46, 143; 901/43, 45, 1; 74/469; 348/47, 46
See application file for complete search history.

(56) References Cited

U.S. PATENT DOCUMENTS

| | | | |
|---|---|---|---|
| 7,742,840 B2* | 6/2010 | Watabe et al. | 700/253 |
| 8,665,328 B2* | 3/2014 | Doettling | 348/143 |
| 2003/0234347 A1 | 12/2003 | Akagi | |
| 2004/0227816 A1 | 11/2004 | Sato et al. | |
| 2005/0055134 A1 | 3/2005 | Okuda et al. | |
| 2005/0207619 A1* | 9/2005 | Lohmann | 382/103 |
| 2005/0222713 A1* | 10/2005 | Kawabe et al. | 700/259 |
| 2006/0041333 A1 | 2/2006 | Anezaki | |
| 2009/0015663 A1* | 1/2009 | Doettling et al. | 348/46 |
| 2010/0191372 A1* | 7/2010 | Nihei et al. | 700/245 |
| 2011/0001957 A1* | 1/2011 | Braune et al. | 356/4.01 |
| 2012/0022689 A1* | 1/2012 | Kapoor | 700/255 |
| 2013/0201292 A1* | 8/2013 | Walter | F16P 3/14 348/47 |
| 2014/0244036 A1* | 8/2014 | Scott | B25J 9/1694 700/253 |
| 2014/0244037 A1* | 8/2014 | Scott | B25J 9/1694 700/253 |

FOREIGN PATENT DOCUMENTS

| | | |
|---|---|---|
| DE | 100 26 711 A1 | 12/2001 |
| DE | 101 52 543 A1 | 5/2003 |
| DE | 103 24 627 A1 | 1/2005 |
| DE | 10 2004 043 514 A1 | 3/2006 |
| JP | A-2001-188016 | 7/2001 |
| JP | 2003-272061 A | 9/2003 |
| JP | A-2005-081445 | 3/2005 |
| JP | 2009-121053 A | 6/2009 |
| JP | 2009-219644 A | 10/2009 |
| JP | 2010-208002 A | 9/2010 |
| WO | 02/073086 A1 | 9/2002 |

* cited by examiner

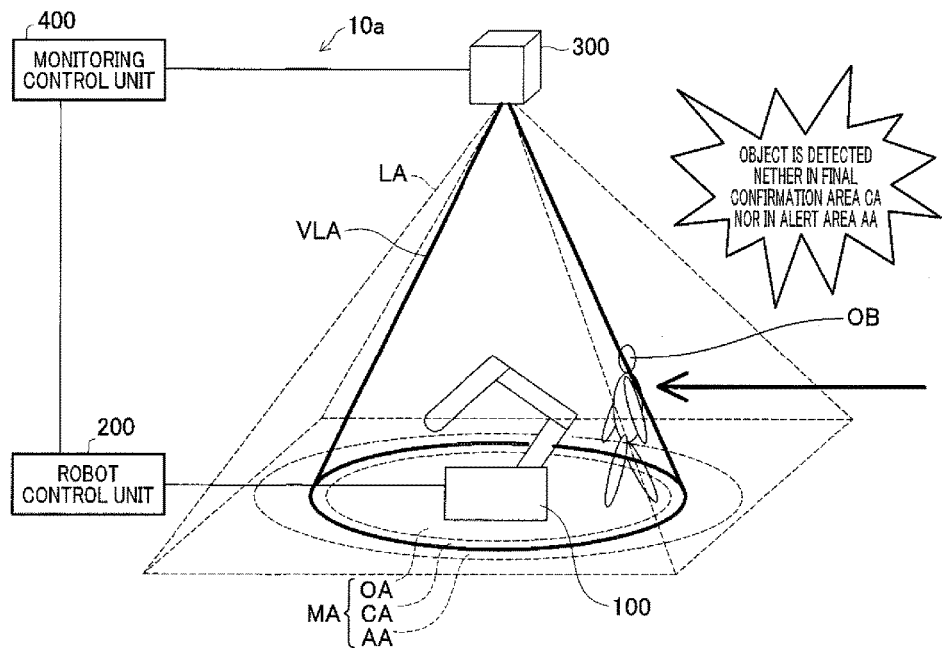
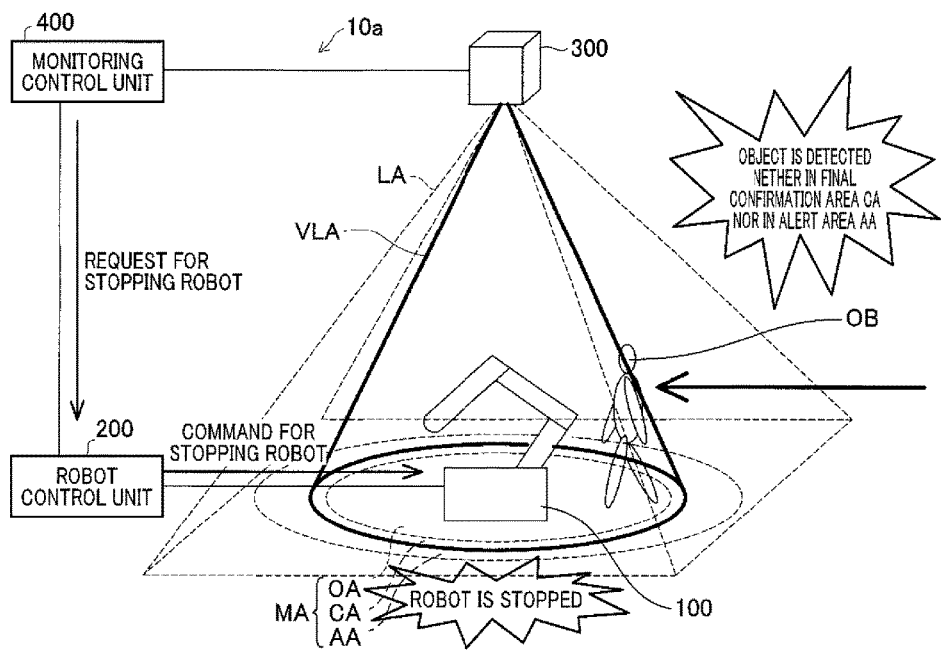

SYSTEM AND METHOD FOR MONITORING ENTRY OF OBJECT INTO SURROUNDING AREA OF ROBOT

CROSS-REFERENCE TO RELATED APPLICATION

This application is based on and claims the benefit of priority from Japanese Patent Application No. 2013-009948, filed on Jan. 23, 2013, the disclosure of which is incorporated herein in its entirety by reference.

BACKGROUND

Technical Field

The present invention relates to a monitoring system and method that monitor entry of an object into the surrounding area of a robot.

Related Art

Robots are widely used such as in automated production facilities. In such automated production facilities, a robot at work is required to be prevented from interfering with an object (e.g., a person). In order to prevent such interference, a fence (also called "safety fence") has generally been set up outside a movable range of the robot to limit entry of the object into this range (e.g., see JP-A-2005-081445).

However, when a worker of the facility, for example, has to come close to the robot by necessity, the worker has to take complicated and time-consuming actions, such as unlocking and opening a door provided in the fence for entry into a region enclosed by the fence, and closing and locking the door after the entry. Therefore, provision of the fence has raised a problem of impairing workability.

SUMMARY

The present invention, which has been made in light of the problem set forth above, can be realized in the form of the following exemplary embodiments.

(1) According to an exemplary embodiment of the present disclosure, there is provided a monitoring system for monitoring entry of an object into a surrounding area of a robot, including a visible light irradiation section that irradiates visible light from a level higher than that of the robot toward at least an outer edge portion of at least one of an operating area, which is set up to enclose a movable range of the robot, and a predetermined area which is set up around the operating area. The visible light irradiation section includes: a visible light source that emits the visible light; and scanning means that scans the visible light from the visible light source toward the at least the outer edge portion of at least one of the operating area and the predetermined area.

The monitoring system may further include a sensor section that monitors entry of a new object, which is not registered in advance, into the operating area.

The monitoring system may further include a monitoring control unit that issues a request for stopping the robot to a robot control unit that controls the robot, when entry of a new object into the operating area is detected by the sensor section.

According to this configuration, entry of a new object into the operating area is monitored, the operating area being set up to enclose the movable range of the robot. When entry of a new object into the operating area is determined to have occurred, a request for stopping the robot is issued to the robot control unit that controls the robot. Thus, without setting up a fence around the robot, the robot at work is prevented from interfering with the new object. In this way, workability will not be impaired, unlike the case where a fence is set up.

Further, this monitoring system, which dispenses with setting up a fence around the robot, can eliminate lots of work and time that would be involved in setting up a fence around the robot.

For example, when a fence is provided around the robot, there may be a necessity, sometime after providing the fence, for displacing the fence because of a little change in the location of the robot. In order to avoid such displacement, the fence tends to be set up with an exceedingly large margin, tending to impair effective usage of the site. In this regard, this monitoring system dispenses with setting up a fence around the robot. In addition, in the event that the location of the robot is changed, the position of setting up the operating area may only have to be changed. With only the change in the position of setting up the operating area, monitoring can be targeted to a minimum adequate area suitable for the new location of the robot. In this way, effective usage of the site is enhanced.

Further, according to this configuration, visible light is irradiated from a level higher than that of the robot toward at least an outer edge portion of at least one of the operating area and the predetermined area set up around the operating area. Thus, a strong alert is called to the operating area and the predetermined area around the operating area, thereby effectively suppressing unintentional entry of an object into the operating area.

(2) In the monitoring system, the sensor section may monitor entry of a new object into an monitored area which is configured by the operating area and an alert area set up around the operating area. The monitoring control unit may control the visible light irradiation section such that: (i) irradiation of the visible light from the visible light irradiation section is stopped in a period in which entry of a new object into the monitored area is not detected by the sensor section; and (ii) the visible light is irradiated toward at least an outer edge portion of the operating area, when entry of a new object into the alert area is detected by the sensor section.

According to this configuration, irradiation of the visible light is stopped in a period in which entry of a new object into the monitored area is determined not to occur. Accordingly, in this period, it will be difficult for a person, such as a worker, to empirically learn the location of the operating area. Thus, for example, the worker is suppressed from working immediately outside the operating area, or carelessly coming close to the robot.

According to this configuration, when entry of a new object into the alert area is determined to have occurred, the visible light is irradiated toward at least an outer edge portion of the operating area. Thus, a strong alert is supplied to the operating area, and thus there will be a low probability that a worker enters the operating area without noticing its presence and unavoidably stopping the robot. Accordingly, workability is suppressed from being impaired.

(3) In the monitoring system, the sensor section may include an invisible light irradiation section that sequentially irradiates invisible light toward irradiated positions of the monitored area, and a light receiving section that receives the invisible light reflected after irradiation. The sensor section may detect whether or not a new object has entered into the irradiated positions of the invisible light on the basis of the invisible light received by the light receiving section.

According to this configuration, entry of a new object into the monitored area can be easily monitored.

(4) In the monitoring system, the visible light irradiation section may be capable of irradiating the visible light toward the same positions as the irradiated positions of the monitored area irradiated by the invisible light irradiation section. The monitoring control unit may control the visible light irradiation section such that: if entry of a new object into the alert area is detected by the sensor section, the visible light is irradiated when the irradiated position of the invisible light lies in the operating area.

According to this configuration, with the simplified configuration, the visible light irradiation section can realize irradiation of the visible light toward the operating area.

(5) In the monitoring system, the sensor section may monitor entry of a new object into a monitored area which is configured by the operating area, a final confirmation area set up around the operating area, and an alert area set up around the final confirmation area. The monitoring control unit may control the visible light irradiation section such that: (i) irradiation of the visible light from the visible light irradiation section is stopped in a period in which entry of a new object into the monitored area is not detected by the sensor section; and (ii) the visible light is irradiated toward at least an outer edge portion of the final confirmation area which is the predetermined area, when entry of a new object into the alert area is detected by the sensor section.

According to this configuration, irradiation of the visible light is stopped in a period in which entry of a new object into the monitored area is determined not to occur. Accordingly, in this period, it will be difficult for a person, such as a worker, to empirically learn the location of the operating area. Thus, for example, the worker is suppressed from working immediately outside the operating area, or carelessly coming close to the robot. Further, according to the monitoring system of the exemplary embodiment, when entry of a new object into the alert area is determined to have occurred, the visible light is irradiated toward at least an outer edge portion of the final confirmation area. Thus, a strong alert is supplied to the final confirmation area, and thus there will be a low probability that a worker enters the final confirmation area without noticing its presence and further enters the operating area inside the final confirmation area which would unavoidably stop the robot. Accordingly, workability is suppressed from being impaired.

(6) In the monitoring system, the sensor section may include an invisible light irradiation section that sequentially irradiates invisible light toward irradiated positions of the final confirmation area and the alert area, and a light receiving section that receives the invisible light reflected after irradiation. The sensor section may detect whether or not a new object has entered into the irradiated positions of the invisible light on the basis of the invisible light received by the light receiving section, and detect, after entry of a new object into the final confirmation area is detected, entry of the new object into the operating area when no entry of the new object into the final confirmation area is detected and no entry of the new object into the alert area is detected.

According to this configuration, entry of a new object into the monitored area can be more easily monitored.

(7) In the monitoring system, the visible light irradiation section may be capable of irradiating the visible light toward the same positions as the irradiated positions of the monitored area irradiated by the invisible light irradiation section. The monitoring control unit may control the visible light irradiation section such that: if entry of a new object into the alert area is detected by the sensor section, the visible light is irradiated when the irradiated position of the invisible light lies in the final confirmation area.

According to this configuration, with the simplified configuration, the visible light irradiation section can realize irradiation of the visible light toward the final confirmation area.

The present disclosure may be realized in various embodiments other than a monitoring system. For example, the present disclosure may be realized in a method of monitoring entry of an object into a surrounding area of a robot, or a method of controlling a monitoring system, or in computer programs realizing these methods, or in a non-transitory storage medium that record the computer programs.

BRIEF DESCRIPTION OF DRAWINGS

In the accompanying drawings:

FIG. 12 is a schematic diagram showing the monitoring process performed by the monitoring system, according to the second embodiment;

FIG. 13 is a schematic diagram showing the monitoring process performed by the monitoring system, according to the second embodiment;

DESCRIPTION OF EMBODIMENTS

A. First Embodiment

A-1. Configuration of Monitoring System

Figure 1:
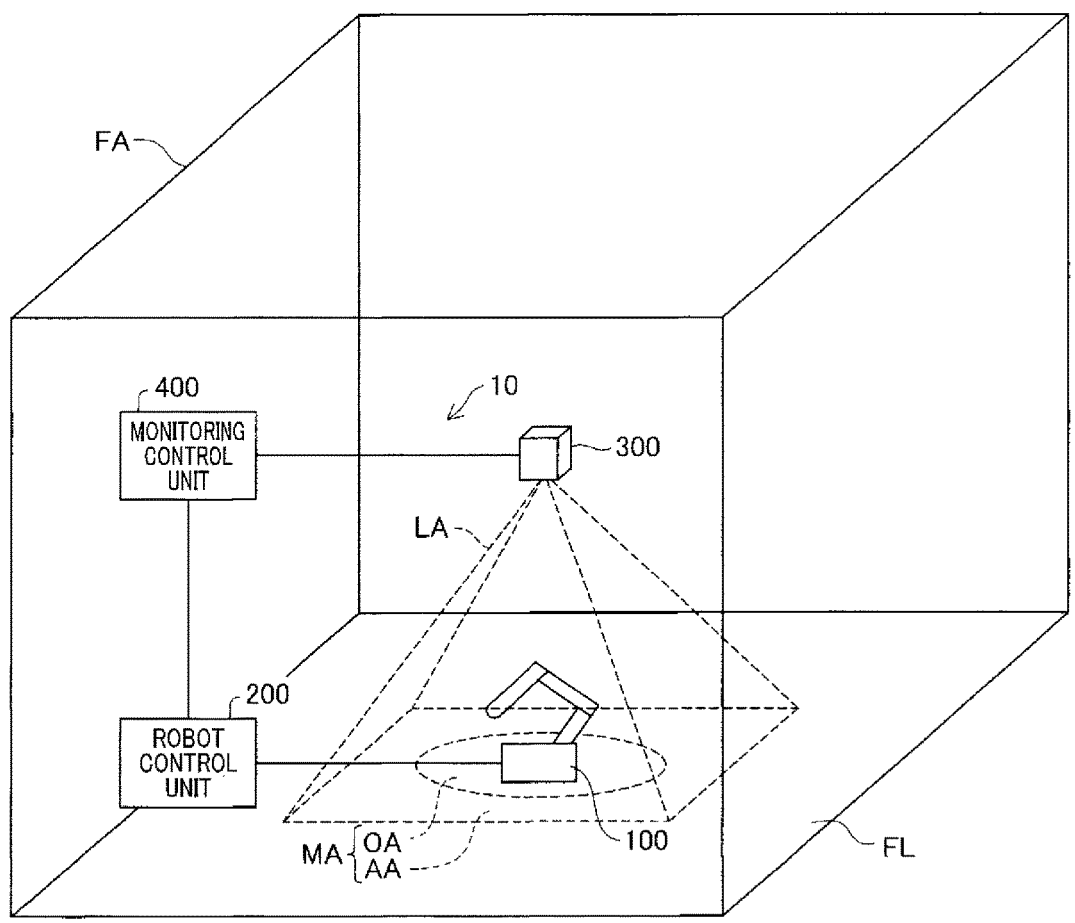
FIG. 1 is a schematic diagram showing a configuration of a monitoring system, according to a first embodiment of the present invention.

FIG. 1 is a schematic diagram illustrating a monitoring system 10, according to the first embodiment. The monitoring system 10 of the present embodiment monitors entry of an object (e.g., a person) into the surrounding area of a robot 100 and stops the movement of the robot 100 as necessary.

In the present embodiment, the robot 100 is an industrial articulated robot having a plurality of joint axes and set up on a floor surface FL of a factory FA. The robot 100 is connected to a robot control unit 200 via a control cable. The robot control unit 200 is configured as a computer that includes a central processing unit (CPU) and a memory. The robot control unit 200 controls movement of the robot 100 by actuating motors provided at respective joints of the robot 100.

The robot 100 has a surrounding area in which an operating area OA and an alert area AA are set up. The operating area OA is a three-dimensional area which is set up to enclose a movable range of the robot 100 (range in which individual portions of the robot 100 can position). The operating area OA may coincide with the movable range of the robot 100, or may be a region configured by the movable range and a predetermined marginal region. The alert area AA is a three-dimensional area set up around the operating area OA. In the present embodiment, the operating area OA and the alert area AA are collectively referred to as a monitored area MA.

In FIG. 1, the operating area OA and the alert area AA on the floor surface FL are shown by broken lines. Although the operating area OA and the alert area AA are set up, neither a fence is provided at the boundary of these areas, nor these areas are defined by a line drawn on the floor surface FL or by different colors. Accordingly, people in the factory FA are in a situation of being unable to usually recognize locations of the operating area OA and the alert area AA.

The monitoring system 10 includes a laser device 300 and a monitoring control unit 400 which is connected to the laser device 300 via a control cable. The monitoring control unit 400 is configured as a computer that includes a central processing unit (CPU) and a memory to control operation of the laser device 300. The monitoring control unit 400 is also connected to the robot control unit 200 via a control cable.

Figure 2:
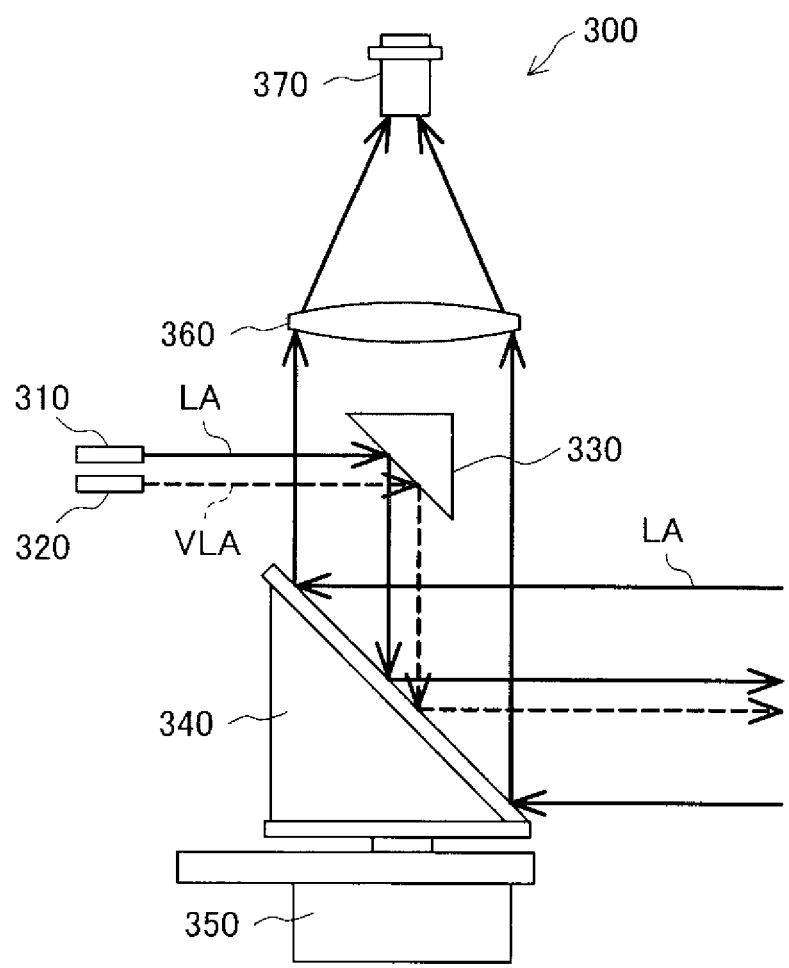
FIG. 2 is a schematic diagram showing a configuration of a laser device of FIG. 1.

FIG. 2 is a schematic diagram illustrating a configuration of the laser device 300. The laser device 300 includes an invisible-light source 310, a visible light source 320, a fixed mirror 330, a rotating mirror 340, a rotation driver 350, a light receiving lens 360 and a light receiving section 370.

The invisible light source 310 emits an invisible laser beam LA (e.g., infrared laser beam). The invisible laser beam LA emitted from the invisible light source 310 is reflected by the fixed mirror 330 and the rotating mirror 340 and then irradiated to the outside of the laser device 300.

As shown in FIG. 1, the laser device 300 is arranged at a level higher than that of the robot 100 in the factory FA. The invisible laser beam LA is irradiated downward from the laser device 300. The rotation driver 350 has a motor (not shown) for rotating the rotating mirror 340. The rotation driver 350 adjusts the orientation of the rotating mirror 340 such that the invisible laser beam LA is irradiated in a desired direction from the laser device 300.

Specifically, the rotation driver 350 sequentially changes the orientation of the rotating mirror 340 such that the invisible laser beam LA is sequentially irradiated to portions of the monitored area MA (area that is a collection of the operating area OA and the alert area AA) set up in the factory FA (i.e. such that the monitored area MA is scanned with the invisible laser beam LA).

In radiating the invisible laser beam LA using the laser device 300 toward the monitored area MA, the invisible laser beam LA is not necessarily required to be irradiated to only the monitored area MA, but may also be irradiated to the area surrounding the monitored area MA.

After being irradiated from the laser device 300, the invisible laser beam LA is reflected by an object and returned to the laser device 300. The returned invisible laser beam LA is reflected by the rotating mirror 340 and enters the light receiving lens 360. The incident invisible laser beam LA is collected through the light receiving lens 360 to the light receiving section 370.

Based on the collected incident invisible laser beam LA, the light receiving section 370 determines whether a new object, which is not registered in advance, has entered into the monitored area MA. Specifically, the light receiving section 370 makes a determination on the basis of an elapsed time from when the invisible laser beam LA is irradiated from the invisible light source 310 until when the invisible laser beam LA is received by the light receiving section 370. If the elapsed time is different from an elapsed time registered in advance for each irradiation position, it is determined that a new object is present at the irradiation position of the invisible laser beam LA in the monitored area MA.

In the laser device 300, the configuration which is involved in irradiating the invisible laser beam LA corresponds to an invisible light irradiation section. Similarly, the configuration involved in receiving the invisible laser beam LA corresponds to a light receiving section. Similarly, the configuration involved in radiating and receiving the invisible laser beam LA collectively corresponds to a sensor section.

The visible light source 320 of the laser device 300 emits a visible laser beam VLA from a position substantially the same as that of the invisible light source 310, in a direction substantially the same as the direction in which the invisible light source 310 emits the invisible laser beam LA.

Accordingly, the visible laser beam VLA emitted from the visible light source 320 is irradiated in a direction corresponding to the orientation of the rotating mirror 340, through the same path as the one along which the invisible laser beam LA is irradiated (In FIG. 2, for the sake of convenience of illustration, the invisible laser beam LA and the visible laser beam VLA are illustrated such that their paths are not overlapped with each other, but actually, these beams are irradiated along the same path).

In other words, the irradiation position of the visible laser beam VLA from the laser device 300 is the same as that of the invisible laser beam LA. The laser device 300 is arranged at a level higher than that of the robot 100 in the factory FA and thus the visible laser beam VLA is irradiated downward from the laser device 300.

In the laser device 300, the configuration involved in irradiating the visible laser beam VLA corresponds to a visible light irradiation section including a scanning system or scanning means.

A-2. Monitoring Process

Figure 3:
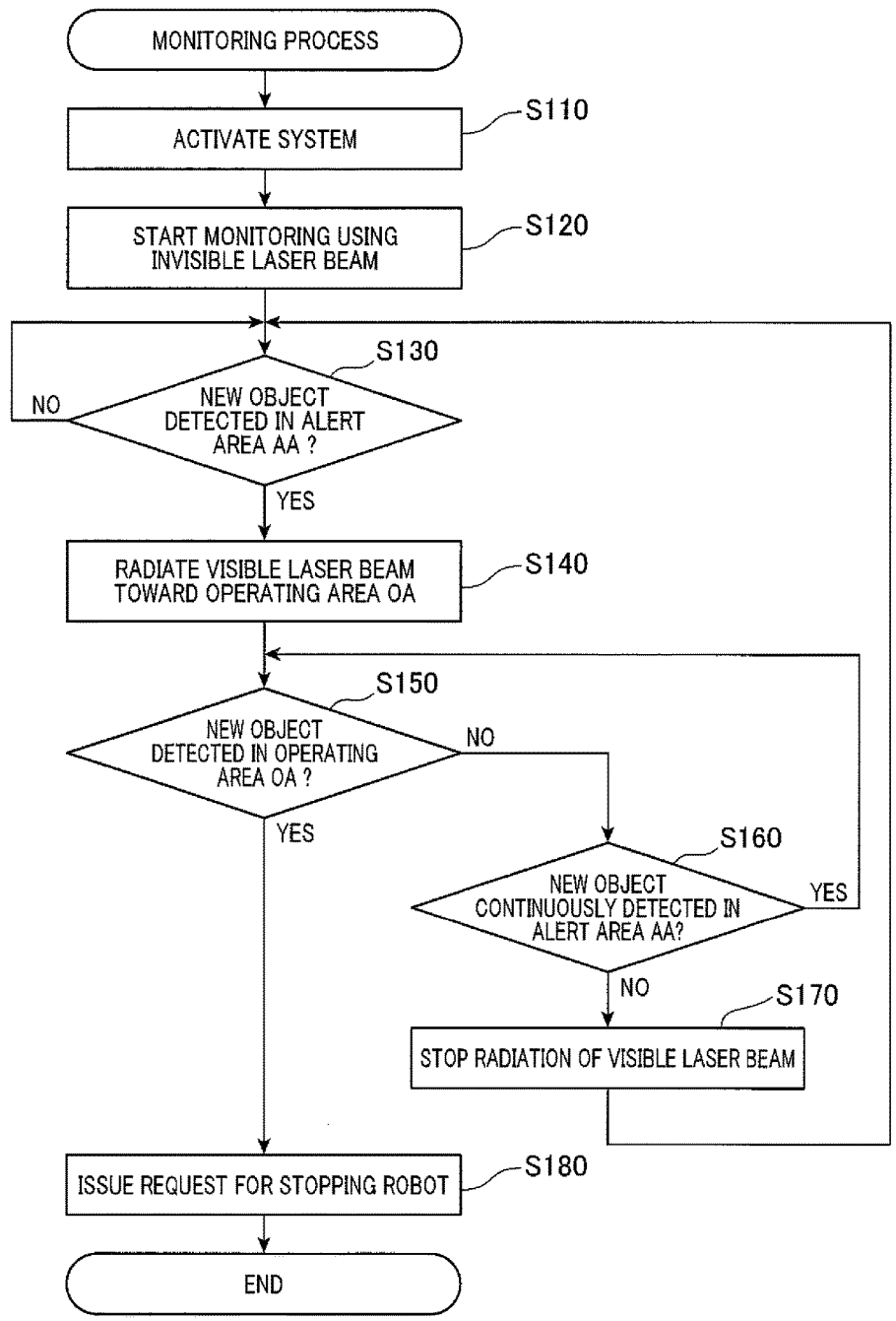
FIG. 3 is a flow chart showing a flow of a monitoring process performed by the monitoring system, according to the first embodiment.

FIG. 3 is a flow diagram showing a flow of a monitoring process performed by the monitoring system 10, according to the first embodiment. FIGS. 4 to 7 are schematic diagrams showing the monitoring process performed by the monitoring system 10. The monitoring system 10 performs the monitoring process to monitor the entry of an object into the surrounding area of the robot 100 and stop the movement of the robot 100 as necessary.

When the robot 100 and the monitoring system 10 are activated (step S110), the invisible laser beam LA emitted from the laser device 300 is used, under the control of the monitoring control unit 400, to monitor the entry of a new object into the monitored area MA (step S120).

Specifically, the monitored area MA is scanned with the invisible laser beam LA emitted from the laser device 300 (FIG. 3, step S120). Then, based on the invisible laser beam LA that has returned to the laser device 300, entry or non-entry of a new object into the monitored area MA is determined (FIG. 3, step S130). At this stage (FIG. 3, step S130), the laser device 300 has not yet irradiated the visible laser beam VLA and thus a person (hereinafter referred to as a "worker") OB of the factory FA is in a situation of being unable to recognize the location of the operating area OA.

Figure 4:
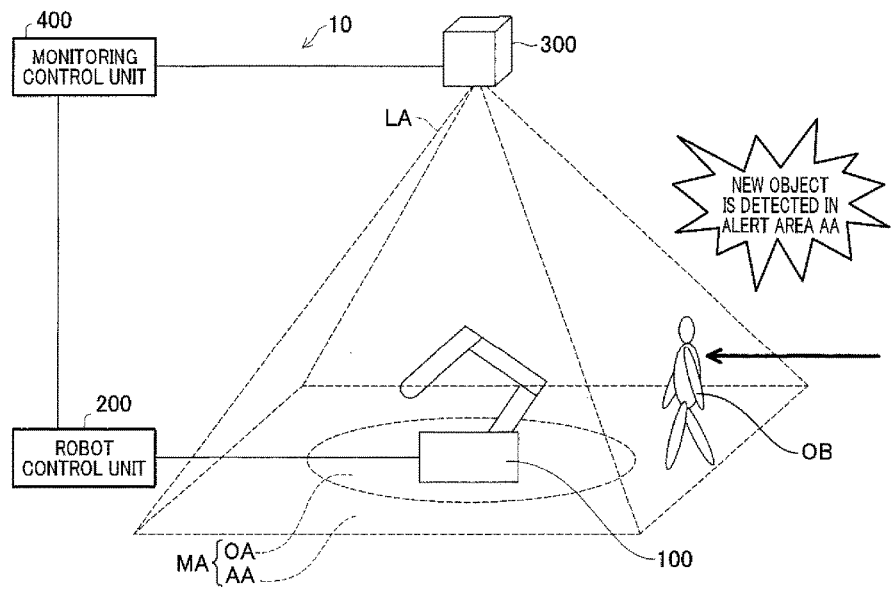
FIG. 4 is a schematic diagram showing the monitoring process performed by the monitoring system, according to the first embodiment.
Figure 5:
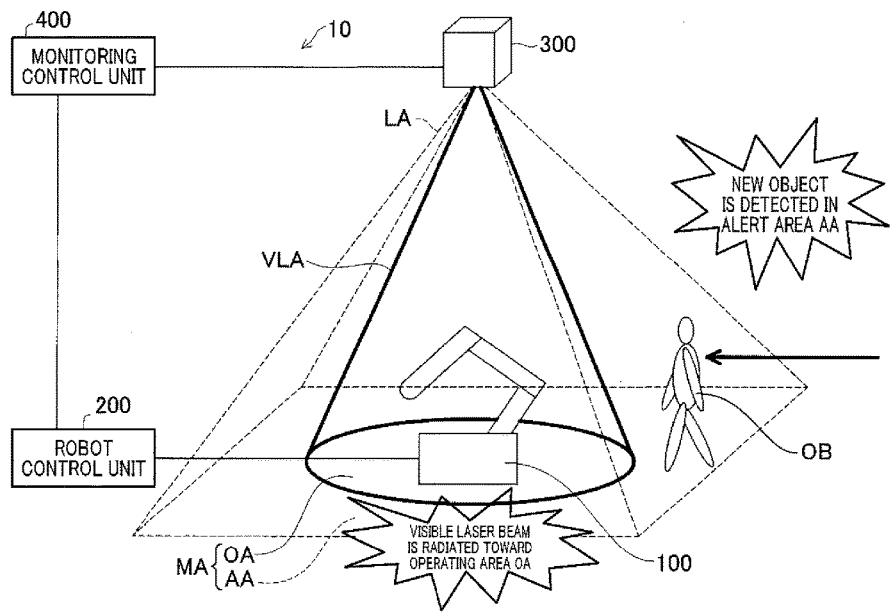
FIG. 5 is a schematic diagram showing the monitoring process performed by the monitoring system, according to the first embodiment.

For example, when the worker OB enters the alert area AA, as shown in FIG. 4, and the entry of a new object into the alert area AA is detected (FIG. 3, YES at step S130), the monitoring control unit 400 allows the laser device 300 to irradiate the visible laser beam VLA toward the operating area OA (FIG. 3, step S140; also see FIG. 5).

Figure 14:
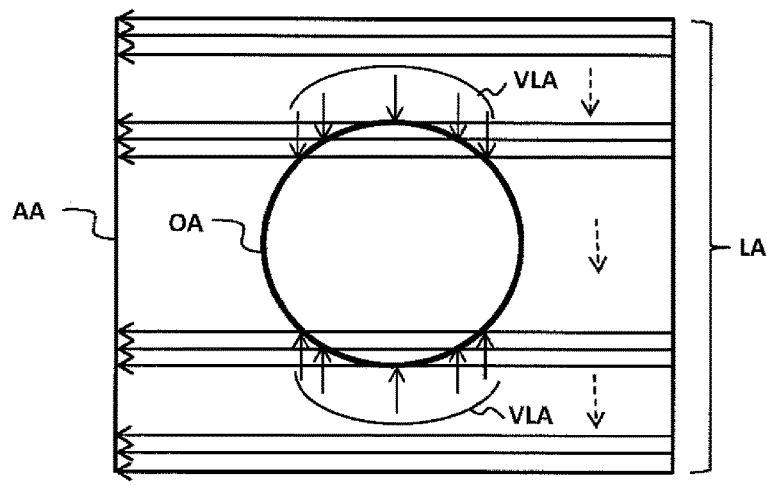
FIG. 14 is a schematic diagram showing a timing of irradiation of visible laser beam from a laser device, according to the first embodiment.

Specifically, as shown in FIG. 14, the monitoring control unit 400 timely allows the laser device 300 to irradiate the visible laser beam VLA when the irradiation position of the invisible laser beam LA falls inside the operating area OA. Then, as shown in FIG. 14, the monitoring control unit 400 timely allows the laser device 300 to stop irradiation of the visible laser beam VLA when the irradiation position of the visible laser beam LA falls outside the operating area OA. This process is repeatedly performed.

Thus, the visible laser beam VLA is irradiated to the entire operating area OA, so that people in the factory FA will be in a situation of being able to recognize the location of the operating area OA. In an initial state, the visible laser beam VLA is not yet irradiated toward the operating area OA but is irradiated for the first time upon entry of a new object into the alert area AA. Therefore, the worker OB of the factory FA will be strongly warned about the operating area OA.

When the laser device 300 irradiates the visible laser beam VLA toward the operating area OA, the visible laser beam VLA is not necessarily required to be irradiated only to the operating area OA, but may also be irradiated to the surrounding area of the operating area OA.

In the following situation, the visible laser beam VLA is kept irradiated toward the operating area OA by the laser device 300. The situation is that, after detecting the entry of a new object into the alert area AA, a new object is continuously detected in the alert area AA (YES at step S160), without detecting the entry of a new object into the operating area OA (NO at step S150).

Thus, the worker OB of the factory FA will be kept warned about the operating area OA. In the following situation, it is regarded that a new object is no longer present in the monitored area MA. The situation is that entry of a new object into the operating area OA is not detected (NO at step S150), and a new object is no longer detected in the alert area AA (NO at step S160). Accordingly, the monitoring control unit 400 allows the laser device 300 to stop irradiation of the visible laser beam VLA (step S170).

Thus, the worker OB of the factory FA will again be in the situation of being unable to recognize the location of the operating area OA. After that, the laser device 300 continues monitoring entry of a new object into the monitored area MA (step S120).

Figure 6:
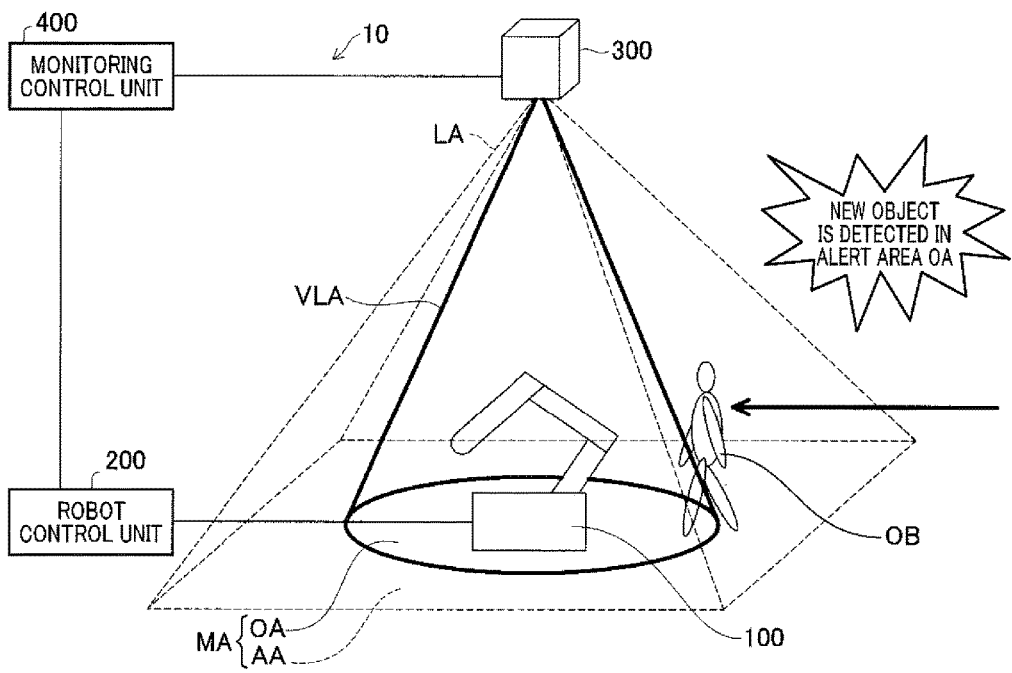
FIG. 6 is a schematic diagram showing the monitoring process performed by the monitoring system, according to the first embodiment.
Figure 7:
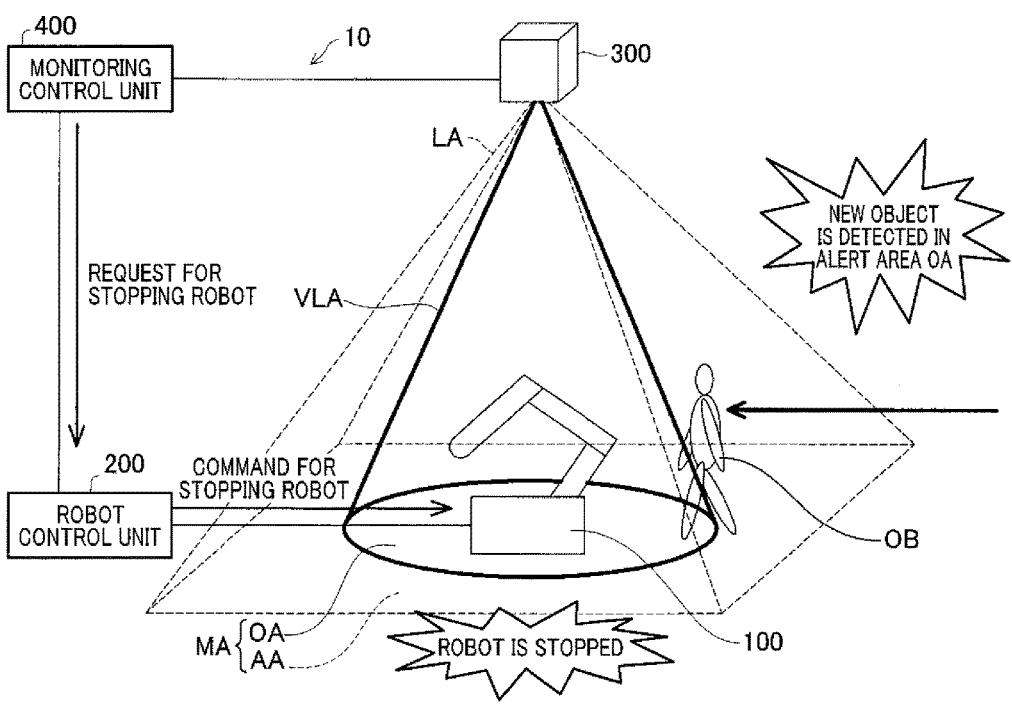
FIG. 7 is a schematic diagram showing the monitoring process performed by the monitoring system, according to the first embodiment.

As shown in FIG. 6, after detection of entry of a new object into the alert area AA (YES at step S130), the worker OB enters the operating area OA. When entry of a new object into the operating area OA is detected (YES at step S150), the monitoring control unit 400 issues a request for stopping the robot 100 to the robot control unit 200 (step S180, see FIG. 7).

In response, the robot control unit 200 issues a stop command to the robot 100. Then, the movement of the robot 100 is stopped.

As described above, in the monitoring system 10 of the present embodiment, entry of a new object into the monitored area MA is monitored. The monitored area MA is configured by the operating area OA which is set up enclosing the movable range of the robot 100, and the alert area AA which is set up around the operating area OA. When it is determined that a new object has entered the operating area OA, a request for stopping the robot 100 is issued to the robot control unit 200.

Accordingly, without setting up a fence around the robot 100, the robot 100 at work is prevented from interfering with the new object as if a fence has been set up. Thus, workability is prevented from being impaired, unlike the case where a fence is set up.

Further, the monitoring system 10 of the present embodiment, which dispenses with setting up a fence around the robot 100, can eliminate lots of work and time that would be involved in setting up a fence around the robot 100.

For example, when a fence is provided around the robot 100, there may be a necessity, sometimes after providing the fence, for displacing the fence because of a little change in the location of the robot 100. In order to avoid such displacement, the fence tends to be set up with an exceedingly large margin, tending to impair effective usage of the site.

In this regard, the monitoring system 10 of the present embodiment dispenses with setting up a fence around the robot 100. In addition, in the event that the location of the robot 100 is changed, the positions of setting up the operating area OA and the alert area AA may only have to be changed. With only the change in the positions of setting up the areas, monitoring can be targeted to a minimum adequate area suitable for the position of setting up the robot 100. In this way, effective usage of the site is enhanced.

Further, in the monitoring system 10 of the present embodiment, the visible laser beam VLA is not irradiated from the laser device 300 in a period in which entry of a new object into the monitored area MA is determined not to occur. Accordingly, in this period, the worker OB of the factory FA is in a situation of being unable to recognize the location of the operating area OA.

Therefore, unlike the case where the operating area OA is defined by a line drawn on the floor surface FL or by different colors, it will be difficult for the worker OB of the factory FA to empirically learn the location of the operating area OA. Thus, for example, the worker OB is suppressed from working immediately outside the operating area OA, or carelessly coming close to the robot 100.

According to the monitoring system 10 of the present embodiment, when it is determined that a new object has entered the alert area AA, the visible laser beam VLA is irradiated from the laser device 300 toward the operating area OA. For example, when the worker OB of the factory FA moves from outside the monitored area MA into the alert area AA which is comparatively near the operating area OA, the state where visible laser beam VLA is not irradiated at all toward the operating area OA, changes to a state where the visible laser beam VLA is irradiated toward the operating area OA. Therefore, the worker OB will be strongly warned about the operating area OA.

Thus, there will be a low probability that the worker OB enters the operating area OA without noticing its presence to unavoidably stop the robot 100. Accordingly, workability is suppressed from being impaired.

In the monitoring system 10 of the present embodiment, the laser device 300 is arranged at a level higher than that of the robot 100. Accordingly, the visible laser beam VLA is irradiated from above the robot 100 toward the operating area OA.

Accordingly, for example, when the worker OB of the factory FA enters the operating area OA, the visible laser beam VLA is irradiated onto the surface of the worker OB. Therefore, compared to the case where the operating area OA is simply indicated on the floor surface FL by a line or a different color, the worker OB will be more strongly warned about the operating area OA. In this way, unintentional entry of the worker OB into the operating area OA can be more effectively suppressed.

In other words, when the visible laser beam VLA is irradiated onto an object, the object is projected with a color. Specifically, when the worker OB enters the operating area OA, a portion (e.g., arm) a body of the worker OB, which has entered the operating area OA, is irradiated with the visible laser beam VLA. Accordingly, the portion of the body having a natural color before entry is suddenly projected with a color by the visible laser beam VLA. When a portion of the body of the worker OB changes from a state of not being projected with a color at all to a state of being projected with a color, the worker OB will usually notice the projected color and thus will be alerted.

In particular, in the present embodiment, the visible laser beam VLA is irradiated from above. Accordingly, the portion of the body of the worker OB him/herself, which is projected with a color by the visible laser beam VLA, will easily come into the worker's sight and will hardly be overlooked. For this reason, the monitoring system 10 of the present embodiment can give a strong warning about the operating area OA to the worker.

Figure 15A:
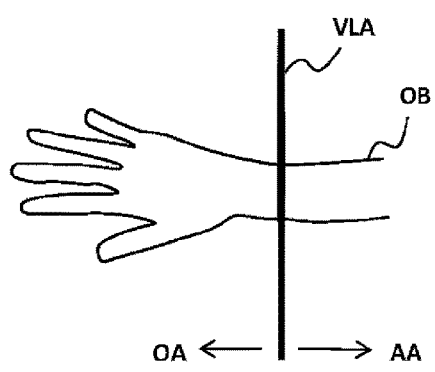
FIGS. 15A and 15B are schematic diagrams showing a state of a portion of a body of a worker which is projected with a color due to visible laser beam irradiated by a laser device.
Figure 15B:
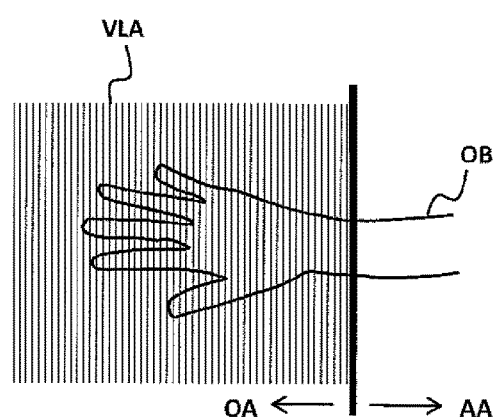

FIG. 15A shows a state of a part of an arm of the worker OB projected with a color due to the visible laser beam VLA which is irradiated toward the outer edge portion of the operating area OA. The laser beam VLA may be irradiated toward the entire region of the operating area OA. FIG. 15B shows a state of a part of an arm of the worker OB projected with a color due to the visible laser beam VLA which is irradiated toward the entire region of the operating area OA.

Since the floor surface FL is an object as well, when the visible laser beam VLA is irradiated toward the operating area OA, the operating area OA on the floor surface FL is projected with a color. Therefore, the boundary of the operating area OA will be clearly shown as a precaution. In this way, similar to the prevention of entry using a fence, the boundary of the operating area OA can be clearly shown, thereby supplying an alert to the operating area OA.

Further, in the monitoring system 10 of the present embodiment, the laser device 300 is able to irradiate the invisible laser beam LA and the visible laser beam VLA to the same position. Specifically, as shown in FIG. 14, the visible laser beam VLA is timely irradiated when the irradiation of the invisible laser beam LA falls inside the operating area OA. Accordingly, with the simplified configuration, the laser device 300 can realize irradiation of the visible laser beam VLA toward the operating area OA.

B. Second Embodiment

Figure 8:
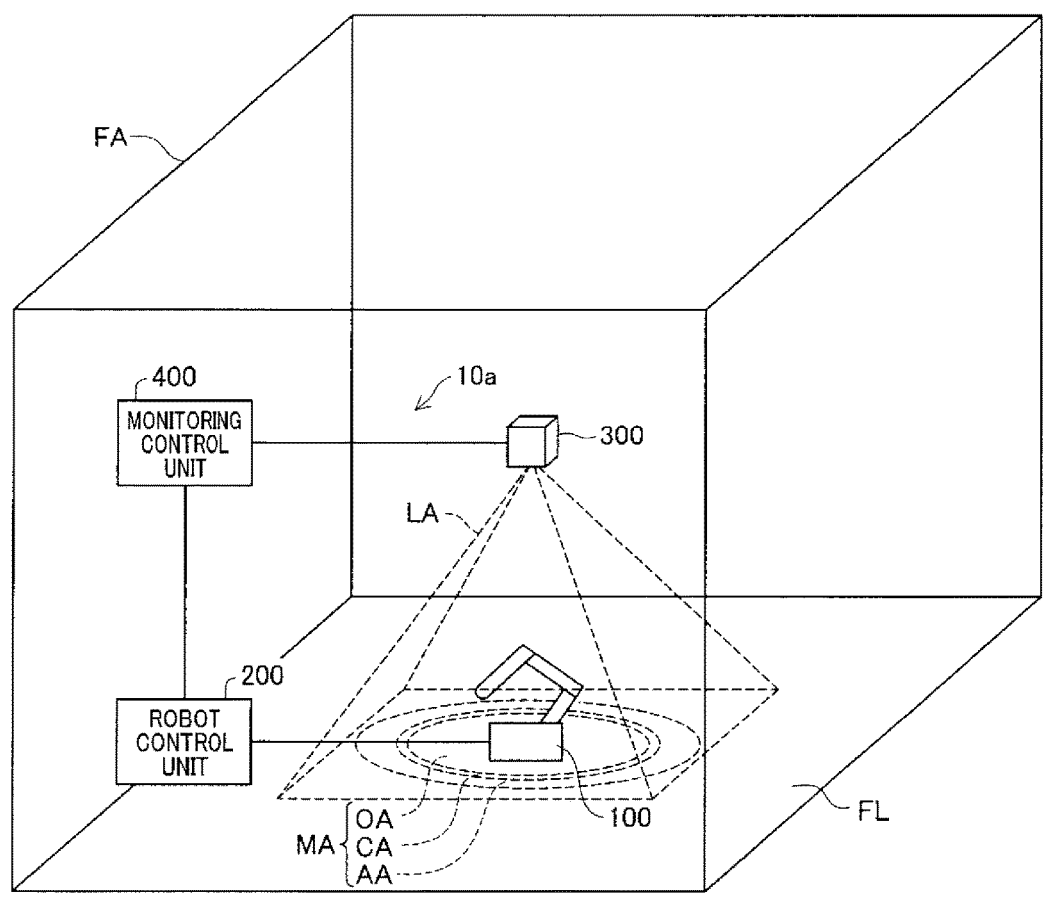
FIG. 8 is a schematic diagram showing a monitoring system, according to a second embodiment of the present invention.

FIG. 8 is a schematic diagram illustrating a monitoring system 10a according to the second embodiment. The second embodiment is different from the first embodiment in the configuration of the monitored area MA provided around the robot 100. Specifically, in the second embodiment, the monitored area MA is configured by an operating area OA, a final confirmation area CA and an alert area AA.

The operating area OA is a three-dimensional area which is set up to enclose a movable range of the robot 100. The final confirmation area CA is a three-dimensional area which is set up around the operating area OA. The alert area AA is a three-dimensional area which is set up around the final confirmation area CA.

In FIG. 8, the operating area OA, the final confirmation area CA and the alert area AA on the floor surface FL are shown by broken lines. Although the operating area OA, the final confirmation area CA and the alert area AA are set up, neither a fence is provided at the boundaries of these areas, nor these areas are indicated by lines drawn on the floor surface FL or by different colors. Accordingly, usually, a person (hereinafter referred to as a "worker") OB of the factory FA is in a situation of being unable to recognize the locations of these areas.

In the second embodiment, the laser device 300 scans the alert area AA and the final confirmation area CA of the monitored area MA, using the invisible laser beam LA to determine entry or non-entry of a new object, which is not registered in advance, into the monitored area MA.

Specifically, with respect to the alert area AA and the final confirmation area CA, the laser device 300 perform scanning using the invisible laser beam LA to directly determine entry or non-entry of a new object. With respect to the operating area OA, the laser device 300 indirectly determine entry or non-entry of a new object on the basis of the result of a determination made on the alert area AA and the final confirmation area CA.

More specifically, the laser device 300 determines entry of a new object into the operating area OA in the following situation. The situation is that, after the entry of a new object into the final confirmation area CA is determined to have occurred, it is determined that a new object has not entered the final confirmation area CA and it is also determined that a new object has not entered the alert area AA.

Since the remaining configuration of the monitoring system 10a is similar to the monitoring system 10 of the first embodiment, description is omitted.

Figure 9:
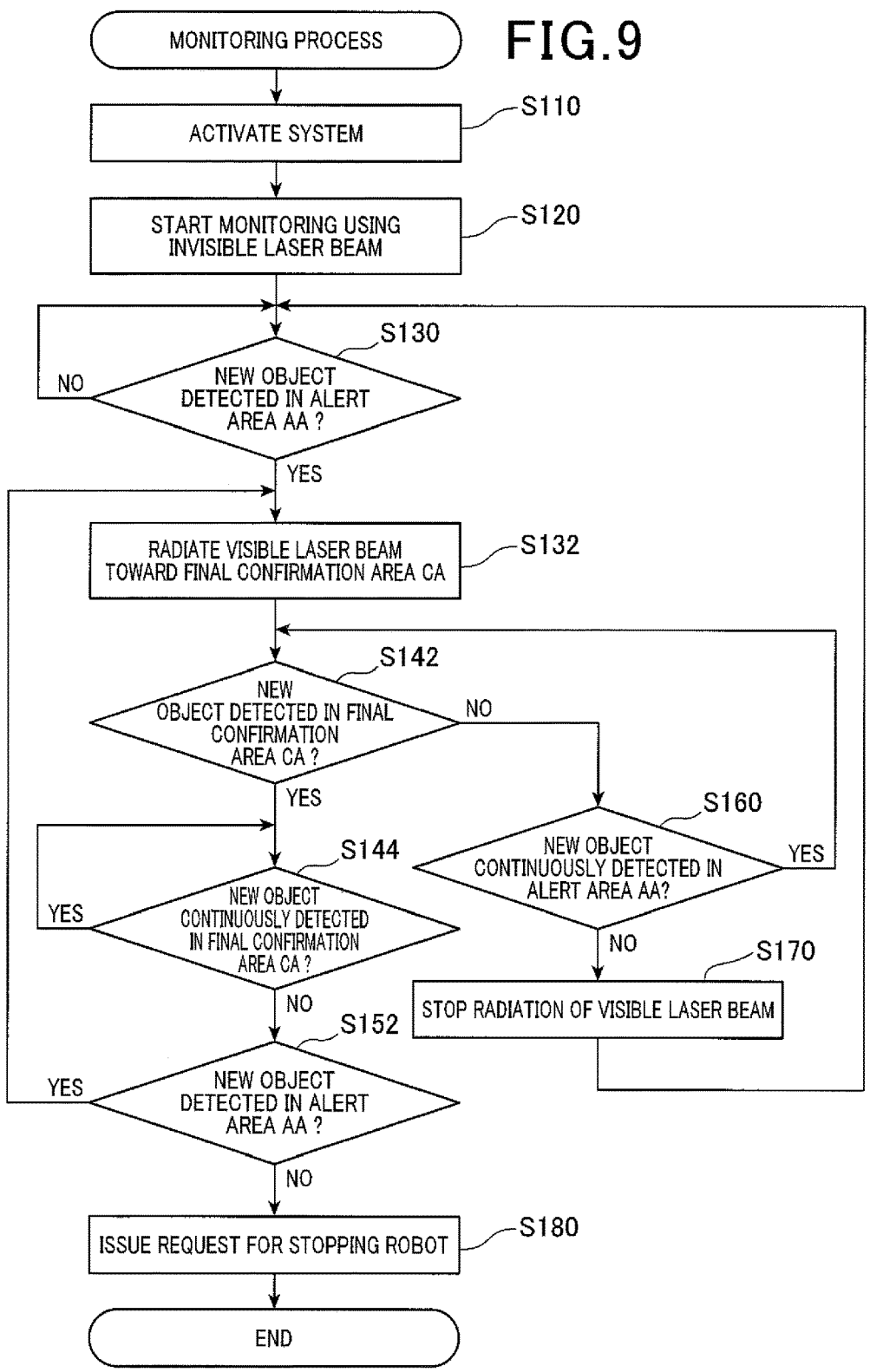
FIG. 9 is a flow chart showing a flow of a monitoring process performed by the monitoring system, according to the second embodiment.

FIG. 9 is a flow diagram showing a flow of a monitoring process performed by the monitoring system 10a of the second embodiment. FIGS. 10 to 13 are schematic diagrams showing the monitoring process performed by the monitoring system 10a.

Similar to the monitoring process of the first embodiment shown in FIG. 3, in the monitoring process of the second embodiment, the laser device 300 starts monitoring upon activation of the robot 100 and the monitoring system 10a (step S110). Specifically, under the control of the monitoring control unit 400, the laser device 300 starts monitoring entry of a new object into the monitored area MA, using the invisible laser beam LA (step S120).

Figure 10:
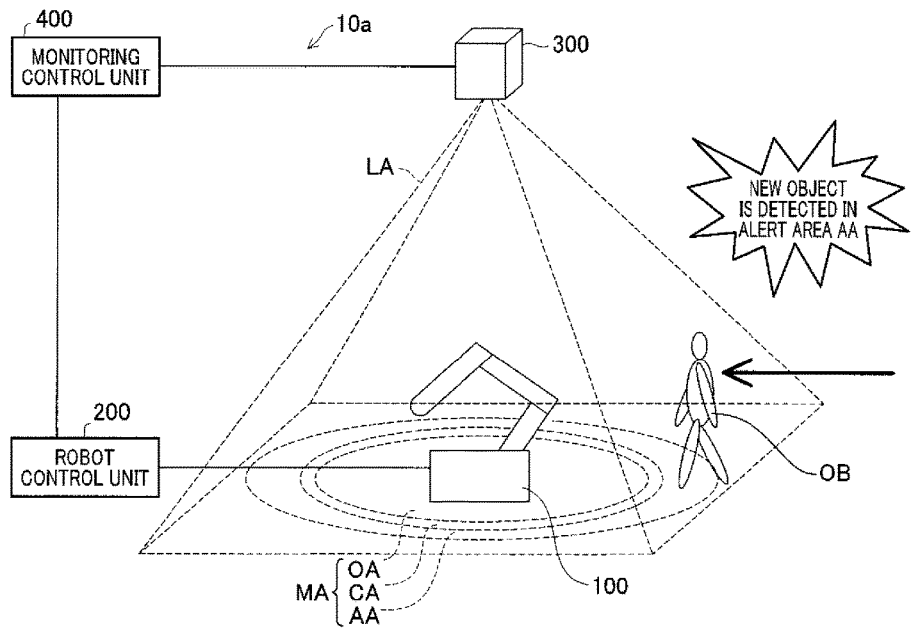
FIG. 10 is a schematic diagram showing the monitoring process performed by the monitoring system, according to the second embodiment.
Figure 11:
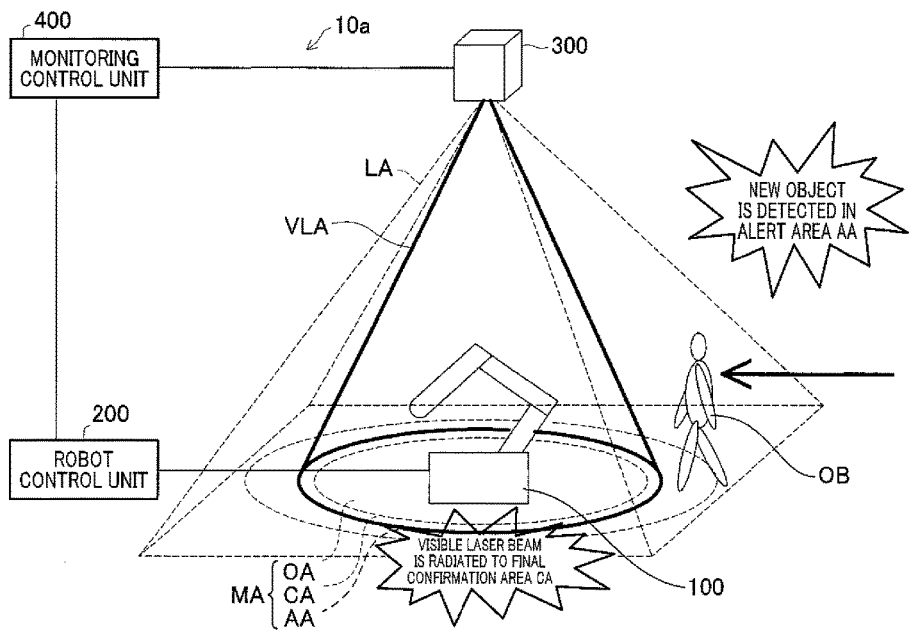
FIG. 11 is a schematic diagram showing the monitoring process performed by the monitoring system, according to the second embodiment.

As shown in FIG. 10, a worker OB of the factory FA enters the alerting area AA. In this case, the laser device 300 detects the entry of a new object into the alert area AA (YES at step S130). Then, the monitoring control unit 400 allows the laser device 300 to irradiate the visible laser beam VLA toward the final confirmation area CA (step S132, see FIG. 11).

Specifically, the monitoring control unit 400 timely allows the laser device 300 to irradiate the visible laser beam VLA when the irradiation position of the invisible laser beam LA falls inside the final confirmation area CA. Then, the monitoring control unit 400 timely allows the laser device 300 to stop irradiation of the visible laser beam VLA when the irradiation position of the invisible laser beam LA falls outside the final confirmation area CA. This process is repeatedly performed.

Thus, the visible laser beam VLA is irradiated to the entire final confirmation area CA, and the worker OB will be in a situation of being able to grasp the location of the final confirmation area CA. The visible laser beam VLA is not irradiated toward the final confirmation area CA in an initial state but will be irradiated for the first time upon entry of a new object into the alert area AA. Therefore, the worker OB will be strongly warned about the final confirmation area CA.

When the laser device 300 irradiates the visible laser beam VLA toward the final confirmation area CA, the visible laser beam VLA is not necessarily required to be irradiated only to the final confirmation area CA, but may also be irradiated to the surrounding area of the final confirmation area CA.

After detecting the entry of a new object into the alert area AA, in a period when the new object is continuously detected in the alert area AA (YES at step S160) without detecting entry of a new object into the final confirmation area CA (NO at step S142), the laser device 300 keeps irradiation of the visible laser beam VLA toward the final confirmation area CA. Therefore, the entered worker OB is kept warned about the final confirmation area CA.

In the following situation, the new object is regarded to be no longer present in the monitored area MA. The situation is that entry of a new object into the final confirmation area CA is not detected (NO at step S142) and a new object is no longer detected in the alert area AA (NO at step S160). In this situation, the monitoring control unit 400 allows the laser device 300 to stop irradiation of the visible laser beam VLA (step S170).

Thus, the worker OB of the factory FA will again be in the situation of not being able to recognize the location of the final confirmation area CA. After that, the laser device 300 continues monitoring entry of a new object into the monitored area MA (step S120).

In the following situation, a new object detected in the final confirmation area CA is regarded to have moved into the alert area AA. The situation is that, after the entry of a new object into the alert area AA has been detected (YES at step S130), entry of a new object into the final confirmation area CA is detected (YES at step S142), then, a new object is no longer detected in the final confirmation area CA (NO at step S144), but a new object is detected in the alert area AA (YES at step S152). In this situation, the laser device 300 continues irradiation of the visible laser beam VLA toward the final confirmation area CA (step S132).

On the other hand, in the following situation, as shown in FIG. 12, a new object detected in the final confirmation area CA is regarded to have moved into the operating area OA. The situation is that, after the entry of a new object into the alert area AA has been detected (YES at step S130), entry of a new object into the final confirmation area CA is detected (YES at step S142), and then, a new object comes to be detected neither in the final confirmation area CA (NO at step S144), nor in the alert area AA (NO at step S152).

Therefore, in this case, the monitoring control unit 400 issues a request to the robot control unit 200, for stopping the robot 100 (step S180, see FIG. 13). In response, the robot control unit 200 issues a stop command to the robot 100. Thus, the movement of the robot 100 is stopped.

As described above, the monitored area MA of the monitoring system 10a according to the second embodiment is configured by the operating area OA which is set up to enclose the movable range of the robot 100, the final confirmation area CA which is set up around the operating area OA and the alert area AA which is set up around the final confirmation area CA. Entry or non-entry of a new object into the monitored area MA is monitored. When entry of a new object into the operating area OA is determined to have occurred, a request for stopping the robot 100 is issued to the robot control unit 200.

Accordingly, without setting up a fence around the robot 100, the robot 100 at work is prevented from interfering with a new object as if a fence has been set up. Thus, workability will not be impaired unlike the case where a fence is set up.

Further, the monitoring system 10a of the second embodiment, which dispenses with setting up a fence around the robot 100, can eliminate lots of work and time that would be involved in setting up a fence around the robot 100.

For example, when a fence is provided around the robot 100, there may be a necessity, sometime after providing the fence, for displacing the fence because of a little change in the location of the robot 100. In order to avoid such displacement, the fence tends to be set up with an exceedingly large margin, tending to impair effective usage of the site.

In this regard, the monitoring system 10a of the second embodiment dispenses with setting up a fence around the robot 100. In addition, in the event that the location of the robot 100 is changed, the positions of setting up the operating area OA, the final confirmation area CA and the alert area AA only have to be changed. With only the change in the setting positions of the areas, monitoring can be targeted to a minimum adequate area suitable for the new location of the robot 100. In this way, effective usage of the site is enhanced.

Further, in the monitoring system 10a of the second embodiment, the visible laser beam VLA is not irradiated from the laser device 300 in a period in which entry of a new object into the monitored area MA is determined not to occur. Accordingly, in this period, the worker OB of the factory FA are in a situation of not being able to recognize the location of the final confirmation area CA and the operating area OA.

Therefore, unlike the case where the final confirmation area CA and the operating area OA are defined by lines drawn on the floor surface FL or by different colors, it will be difficult for the worker OB of the factory FA to empirically learn the location of the final confirmation area CA and the operating area OA. Thus, the worker OB, for example, is suppressed from working immediately outside the operating area OA, or carelessly coming close to the robot 100.

According to the monitoring system 10a of the second embodiment, when it is determined that a new object has entered the alert area AA, the visible laser beam VLA is irradiated from the laser device 300 toward the final confirmation area CA. For example, when a worker OB of the factory FA moves from outside the monitored area MA into the alert area AA which is comparatively near the operating area OA, the situation there changes from a situation where the visible laser beam VLA is not irradiated at all toward the final confirmation area CA, to a situation where the visible laser beam VLA is irradiated toward the final confirmation area CA. Therefore, the worker OB will be strongly warned about the final confirmation area CA.

Thus, there will be a low probability that the worker OB enters the final confirmation area CA without noticing its presence and further enters the operating area OA to unavoidably stop the robot 100. Accordingly, workability is suppressed from being impaired.

In the monitoring system 10a of the second embodiment, the operating area OA, which is set up to enclose the movable range of the robot 100, is enclosed by the final confirmation area CA. Since the monitoring system 10a can warn about the final confirmation area CA, unintentional entry of the worker OB into the operating area OA can be more reliably suppressed.

In the monitoring system 10a of the second embodiment, the laser device 300 is arranged at a level higher than that of the robot 100. Accordingly, the visible laser beam VLA is irradiated from above the robot 100 toward the final confirmation area CA.

Thus, for example, when a worker of the factory FA enters the final confirmation area CA, the visible laser beam VLA will be irradiated onto the surface of the worker OB. Therefore, compared to the case where the final confirmation area CA is simply indicated on the floor surface FL by a line or a different color, the worker will be more strongly warned about the final confirmation area CA. In this way, unintentional entry of the worker OB into final confirmation area CA and the operating area OA can be more effectively suppressed.

In other words, when the visible laser beam VLA is irradiated onto an object, the object will be projected with a color. Specifically, when a worker OB of the factory FA enters the final confirmation area CA, a portion (e.g., arm) of a body of the worker OB, which has entered the final confirmation area CA, will be irradiated with the visible laser beam VLA. Accordingly, the portion of the body having a natural color before entry is suddenly projected with a color by the visible laser beam VLA. When a portion of the body of the worker OB changes from a state of not being projected with a color at all to a state of being projected with a color, the worker OB will usually notice the projected color and be alerted.

In particular, in the present embodiment, the visible laser beam VLA is irradiated from above. Accordingly, the portion of the body of the worker OB him/herself, which is projected with a color by the visible laser beam VLA, will easily come into the worker's sight and is unlikely to be overlooked. For this reason, the monitoring system 10a of the present embodiment can call a strong alert to the final confirmation area CA.

Since the floor surface FL is also an object, when the visible laser beam VLA is irradiated toward the final confirmation area CA, the final confirmation area CA on the floor surface FL will be projected with a color. Therefore, a boundary of the final confirmation area CA will be clearly shown as a precaution. In this way, similar to the prevention of entry using a fence, the boundary of the final confirmation area CA can be clearly shown and can give a warning about the final confirmation area CA to the worker OB.

Further, in the monitoring system 10a of the second embodiment, the laser device 300 is able to irradiate the invisible laser beam LA and the visible laser beam VLA to the same position. Specifically, the visible laser beam VLA is timely irradiated when the irradiation position of the invisible laser beam LA falls inside the final confirmation area CA. Accordingly, with the simplified configuration, the laser device 300 can realize irradiation of the visible laser beam VLA toward the final confirmation area CA.

In addition, in the monitoring system 10a of the second embodiment, the scanning range of the laser device 300 with the invisible laser beam LA is set to only the alert area AA and the final confirmation area CA, and the operating area OA is left outside the scanning range. Thus, entry of a new object into the monitored area MA can be more easily monitored using the invisible laser beam LA.

C. Modifications

In the embodiments described above, a monitored target of the monitoring system 10 is an industrial articulated robot set up on the floor surface FL of the factory FA. Alternative to this, the monitoring system 10 may monitor any robot set up in any place, similar to the above embodiments.

In the embodiments described above, the irradiation position of the visible laser beam VLA irradiated from the laser device 300 is ensured to coincide with that of the invisible laser beam LA. Alternatively, the irradiation position of these beams may be different from each other.

For example, in the first embodiment, the visible laser beam VLA may be stably irradiated toward the operating area OA. In the second embodiment, the visible laser beam VLA may be stably irradiated toward the final confirmation area CA.

Further, the laser device 300 may perform only the monitoring of entry of a new object into the monitored area MA without performing laser irradiation. In other words, the visible laser beam VLA may be irradiated from a visible light irradiation device independent of the laser device 300.

In the embodiments described above, the visible laser beam VLA is irradiated toward the operating area OA (or the final confirmation area CA) when a new object is detected in the alert area AA. However, other visible light than a laser beam may be irradiated in place of the visible laser beam VLA.

In the embodiments described above, the visible laser beam VLA is irradiated to the entire operating area OA (or the final confirmation area CA). However, the visible laser beam VLA may only have to be irradiated toward at least an outer edge portion of the operating area OA (or the final confirmation area CA).

If only the visible laser beam VLA is irradiated toward at least an outer edge portion of the operating area OA (or the final confirmation area CA), people in the factory FA can recognize the location of the operating area OA (or the final confirmation area CA).

In the embodiments described above, the visible laser beam VLA is irradiated toward the operating area OA (or the final confirmation area CA) when a new object is detected in the alert area AA. Alternative to this, the visible laser beam VLA may be constantly irradiated toward the operating area OA (or the final confirmation area CA) from the actuation of the monitoring system.

In this case as well, when the visible laser beam VLA is irradiated toward the operating area OA (or the final confirmation area CA) from above the robot 100, a stronger warning about the operating area OA (or the final confirmation area CA) can be given to the entered person. In this case, the alert area AA may be excluded from the monitored area MA.

In the embodiments described above, entry of a new object into the monitored area MA is monitored through irradiation and reception of the invisible laser beam LA. Alternatively, entry of a new object into the monitored area MA may be monitored using a different method such as of picking up images of the area with a camera, followed by processing the images.

In the embodiments described above, the shape of the operating area OA or the final confirmation area CA, and the alert area AA is not limited to be conical or pyramidal, but may be optionally selected. Further, in the embodiments described above, connection between the laser device 300 and the monitoring control unit 400, or the connection between the monitoring control unit 400 and the robot control unit 200 may be established using wireless connection in place of the control cable.

The present invention is not limited to the embodiments or modifications set forth above but may be realized with various configurations within a scope not departing from the spirit of the invention. For example, appropriate replacement or combination may be made in the embodiments corresponding to the technical features in the modes set forth in the summary of the invention, or the technical features in the modifications, in order to solve a part or all of the problems or in order to exert a part or all of the effects described above. Further, the technical features, unless they are described to be essential in the present specification, may be removed as appropriate.

What is claimed is:

1. A monitoring system for monitoring entry of an object into a surrounding area of a robot set up in a factory, comprising:
    a visible light irradiation section that irradiates visible light from a level higher than that of the robot toward at least an outer edge portion of an operating area, which is set up to enclose a movable range of the robot, the visible light irradiation section including:
        a visible light source that emits the visible light; and
        a scanning system that scans the visible light from the visible light source toward the operating area;
    a sensor section that monitors entry of a new object, which is not registered in advance, into the operating area; and
    a monitoring control unit that issues a request for stopping the robot to a robot control unit that controls the robot, when entry of the new object into the operating area is detected by the sensor section, wherein
    the sensor section monitors entry of the new object into a monitored area which is configured by the operating area and an alert area set up around the operating area, and
    the monitoring control unit controls the visible light irradiation section such that
    (i) irradiation of the visible light from the visible light irradiation section is stopped in a period in which entry of the new object into the monitored area is not detected by the sensor section, and
    (ii) the visible light is irradiated from the visible light irradiation section toward at least the outer edge portion of the operating area in response to entry of the new object into the alert area being detected by the sensor section, wherein no visible light is irradiated until entry of the new object into the alert area is detected by the sensor section.

2. The monitoring system according to claim 1, wherein the sensor section includes an invisible light irradiation section that sequentially irradiates invisible light toward irradiated positions of the monitored area, and a light receiving section that receives the invisible light reflected after irradiation, and
    the sensor section detects whether or not the new object has entered into the irradiated positions of the invisible light on the basis of the invisible light received by the light receiving section.

3. The monitoring system according to claim 2, wherein the visible light irradiation section is capable of irradiating the visible light toward the same positions as the irradiated positions of the monitored area irradiated by the invisible light irradiation section, and
    the monitoring control unit controls the visible light irradiation section such that
    if entry of the new object into the alert area is detected by the sensor section, the visible light is irradiated when the irradiated position of the invisible light lies in the operating area.

4. A monitoring system for monitoring entry of an object into a surrounding area of a robot set up in a factory, comprising:
    a visible light irradiation section that irradiates visible light from a level higher than that of the robot toward at least an outer edge portion of at least one of an operating area, which is set up to enclose a movable range of the robot, and a final confirmation area which has a predetermined width and is set up around the operating area, the visible light irradiation section including:
        a visible light source that emits the visible light; and
        a scanning system that scans the visible light from the visible light source toward the final confirmation area, in such a manner that when the object enters the final confirmation area around the operating area, a portion of a body of the object which has entered the final confirmation area around the operating area is irradiated with the visible light so that the portion of the body having a natural color before entry is projected with a color by the visible light;
    a sensor section that monitors entry of a new object, which is not registered in advance, into the operating area; and
    a monitoring control unit that issues a request for stopping the robot to a robot control unit that controls the robot, when entry of the new object into the operating area is detected by the sensor section, wherein
    the sensor section monitors entry of the new object into a monitored area which is configured by the operating area, the final confirmation area set up around the operating area, and an alert area set up around the final confirmation area, and
    the monitoring control unit controls the visible light irradiation section such that
    (i) irradiation of the visible light from the visible light irradiation section is stopped in a period in which entry of the new object into the monitored area is not detected by the sensor section, and
    (ii) the visible light is irradiated from the visible light irradiation section toward at least the outer edge portion of the final confirmation area in response to entry of the new object into the alert area being detected by the sensor section, wherein no visible light is irradiated until entry of the new object into the alert area is detected by the sensor section.

5. The monitoring system according to claim 4, wherein the sensor section includes an invisible light irradiation section that sequentially irradiates invisible light toward irradiated positions of the final confirmation area and the alert area, and a light receiving section that receives the invisible light reflected after irradiation, and
    the sensor section detects whether or not the new object has entered into the irradiated positions of the invisible light on the basis of the invisible light received by the light receiving section, and detects, after entry of the new object into the final confirmation area is detected, entry of the new object into the operating area when no entry of the new object into the final confirmation area is detected and no entry of the new object into the alert area is detected.

6. The monitoring system according to claim 5, wherein the visible light irradiation section is capable of irradiating the visible light toward the same positions as the irradiated positions of the monitored area irradiated by the invisible light irradiation section, and
the monitoring control unit controls the visible light irradiation section such that
if entry of the new object into the alert area is detected by the sensor section, the visible light is irradiated when the irradiated position of the invisible light lies in the final confirmation area.

7. A monitoring method for monitoring entry of an object into a surrounding area of a robot set up in a factory, the monitoring method comprising:
   a step of irradiating, at a visible light irradiation section, visible light from a level higher than that of the robot toward at least an outer edge portion of an operating area, which is set up to enclose a movable range of the robot, the step of irradiating including:
      a step of emitting, from a visible light source, the visible light; and
      a step of scanning, by a scanning system, the visible light from the visible light source toward the operating area;
   a step of monitoring, at a sensor section, entry of a new object, which is not registered in advance, into the operating area; and
   a step of issuing, at a monitoring control unit, a request for stopping the robot to a robot control unit that controls the robot, when entry of the new object into the operating area is detected by the sensor section, wherein
   the step of monitoring is a step of monitoring, at the sensor section, entry of the new object into a monitored area which is configured by the operating area and an alert area set up around the operating area, and
   the step of irradiating includes
      a step of stopping irradiating visible light from the visible light irradiation section in a period in which entry of the new object into the monitored area is not detected, and
      a step of irradiating the visible light from the visible light irradiation section toward at least the outer edge portion of the operating in response to entry of the new object into the alert area being detected by the sensor section, wherein no visible light is irradiated until entry of the new object into the alert area is detected by the sensor section.

8. A monitoring method for monitoring entry of an object into a surrounding area of a robot set up in a factory, the monitoring method comprising:
   a step of irradiating, at a visible light irradiation section, visible light from a level higher than that of the robot toward at least an outer edge portion of at least one of an operating area, which is set up to enclose a movable range of the robot, and a final confirmation area which has a predetermined width and is set up around the operating area, the step of irradiating including:
      a step of emitting, from a visible light source, the visible light; and
      a step of scanning, by a scanning system, the visible light from the visible light source toward the final confirmation area, in such a manner that when the object enters the final confirmation area around the operating area, a portion of a body of the object which has entered the final confirmation area around the operating area is irradiated with the visible light so that the portion of the body having a natural color before entry is projected with a color by the visible light;
   a step of monitoring, at a sensor section, entry of a new object, which is not registered in advance, into the operating area; and
   a step of issuing, at a monitoring control unit, a request for stopping the robot to a robot control unit that controls the robot, when entry of the new object into the operating area is detected by the sensor section, wherein
   the step of monitoring is a step of monitoring, at the sensor section, entry of the new object into a monitored area which is configured by the operating area, the final confirmation area set up around the operating area, and an alert area set up around the final confirmation area, and
   the step of irradiating includes
      a step of stopping irradiating the visible light from the visible light irradiation section in a period in which entry of the new object into the monitored area is not detected, and
      a step of irradiating the visible light from the visible light irradiation section toward at least the outer edge portion of the final confirmation area in response to entry of the new object into the alert area being detected by the sensor section, wherein no visible light is irradiated until entry of the new object into the alert area is detected by the sensor section.

9. The monitoring system according to claim 1, wherein the visible light is irradiated to the entire operating area in response to entry of the new object into the alert area being detected by the sensor section.

10. The monitoring system according to claim 4, wherein the visible light is irradiated to the entire operating area in response to entry of the new object into the alert area being detected by the sensor section.

11. The monitoring method according to claim 7, wherein the visible light is irradiated to the entire operating area in response to entry of the new object into the alert area being detected by the sensor section.

12. The monitoring method according to claim 8, wherein the visible light is irradiated to the entire operating area in response to entry of the new object into the alert area being detected by the sensor section.

* * * * *